United States Patent [19]

Kikitsu et al.

[11] Patent Number: 5,105,400
[45] Date of Patent: Apr. 14, 1992

[54] METHOD OF MAGNETO-OPTICALLY RECORDING AND ERASING INFORMATION ONTO A MAGNETO-OPTICAL INFORMATION STORAGE MEDIUM

[75] Inventors: Akira Kikitsu, Yokohama; Katsutarou Ichihara; Sumio Ashida, both of Tokyo, all of Japan

[73] Assignee: Kabushiki Kaisha Toshiba, Kawasaki, Japan

[21] Appl. No.: 370,764

[22] Filed: Jun. 23, 1989

[30] Foreign Application Priority Data

Jun. 23, 1988 [JP] Japan ................................. 63-153548

[51] Int. Cl.$^5$ ...................... G11B 13/04; G11B 11/10; G11B 11/12
[52] U.S. Cl. ......................... 369/13; 360/59; 365/122
[58] Field of Search ..................... 369/13; 360/59, 114; 365/122

[56] References Cited

U.S. PATENT DOCUMENTS

| | | | |
|---|---|---|---|
| 4,649,519 | 3/1987 | Sun et al. | 365/122 |
| 4,771,347 | 9/1988 | Horimai et al. | 369/13 X |
| 4,794,560 | 12/1988 | Bell et al. | 369/13 |
| 4,799,114 | 1/1989 | Tsunashima | 360/59 |
| 4,855,975 | 8/1989 | Akasaka et al. | 360/59 |

FOREIGN PATENT DOCUMENTS

| | | |
|---|---|---|
| 0225141 | 6/1987 | European Pat. Off. |
| 0257530 | 3/1988 | European Pat. Off. |
| 0217096 | 12/1989 | European Pat. Off. |
| 0227480 | 12/1989 | European Pat. Off. |
| 3619618 | 12/1986 | Fed. Rep. of Germany |
| 62-154347 | 9/1987 | Japan |

Primary Examiner—Stuart S. Levy
Assistant Examiner—Hoa Nguyen
Attorney, Agent, or Firm—Oblon, Spivak, McClelland, Maier & Neustadt

[57] ABSTRACT

A method of magneto-optically recording and erasing information which comprises irradiating pulse-like laser beam onto a magneto-optical information storage medium including recording and bias layers which has perpendicular magnetic anisotropy and which are stacked one upon the other to apply coupling interaction which is mainly magnetostatic interaction to each other, and magnetization-reversing temperature of the bias layer being higher than that of the recording layer. When the recording laser beam is irradiated onto the medium, the beam-irradiated portion of the medium is heated to form a reversed magnetic domain in the bias layer, magnetization of the recording layer is reversed by first leakage magnetic field applied to the recording layer when beam-irradiated portion is then cooled, and magnetization of the bias layer is directed in same direction as that under initial state by second leakage magnetic field, applied to the bias layer. When the erasing layer beam is irradiated onto the medium, the beam-irradiated portion of the medium is heated to the magnetization-reversing temperature of the recording layer, and due to third leakage magnetic field applied to the recording layer at this time, the direction of magnetization of the recording layer is re-reversed.

3 Claims, 7 Drawing Sheets

FIG. 3A  INITIAL STATE T=Ta 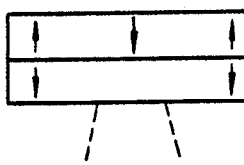  BIAS LAYER ↕Hex RECORDING LAYER

FIG. 3B  LASER BEAM RADIATION $T_{compB} < T < T_W$ 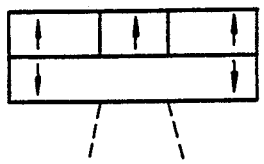

FIG. 3C  LASER BEAM RADIATION $T = T_W$ 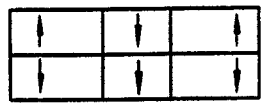

FIG. 3D  COOLING PROCESS $T_{compB} > T = T_{CP}$ 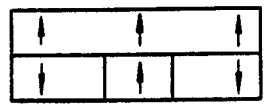

} RECORDING OPERATION (BEAM OF HIGH LEVEL)

FIG. 3E  AFTER COOLING $T_{compR} > T = T_{ini}$ 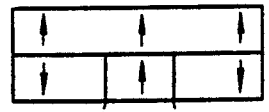 ↕Hex

FIG. 3F  LASER BEAM RADIATION $T < T_{compR}$ 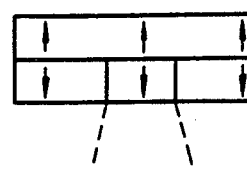

FIG. 3G  LASER BEAM RADIATION $T_{compR} < T < T_{CP}$ 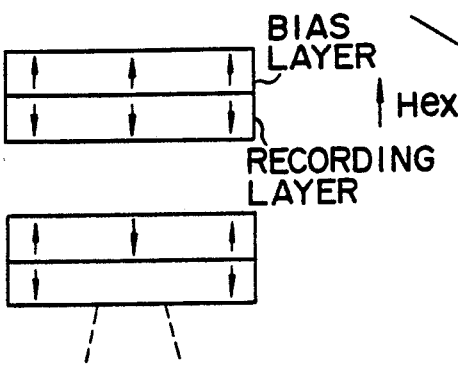

FIG. 3H  LASER BEAM RADIATION $T_{compB} > T = T_{CP}$ 

FIG. 3I  AFTER COOLING $T_{compR} > T = T_{ini}$ 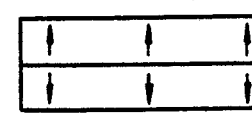

} ERASING OPERATION (BEAM OF LOW LEVEL)

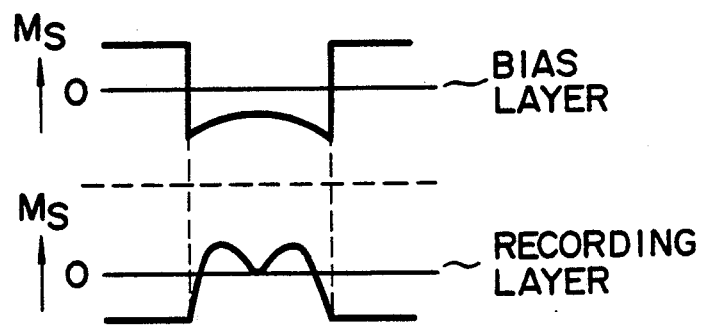
F I G. 4A
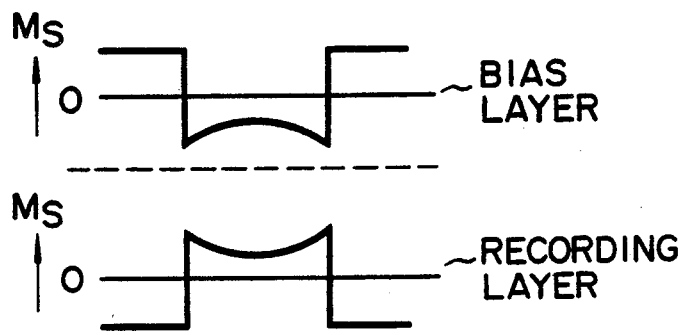
F I G. 4B
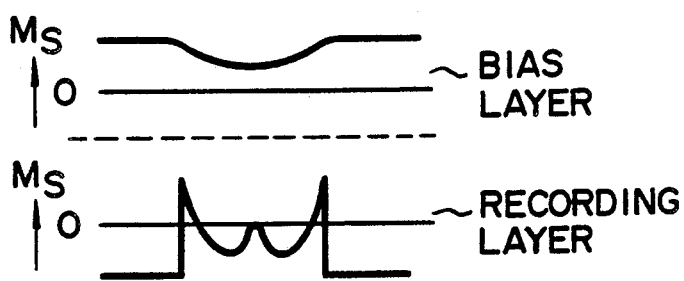
F I G. 4C
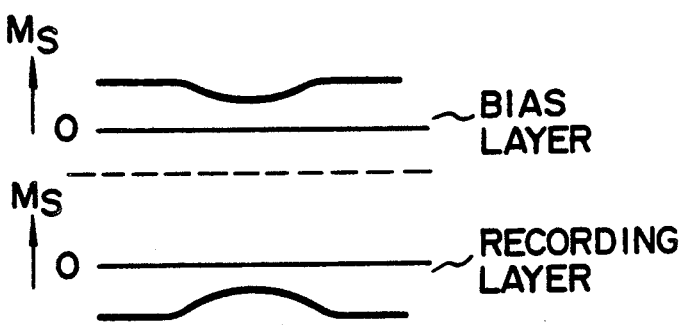
F I G. 4D FIG. 5A  INITIAL STATE
T=Ta
FIG. 5B  LASER BEAM RADIATION
$T_{compB} < T < T_{CP}$
FIG. 5C  LASER BEAM RADIATION
$T = T_W$
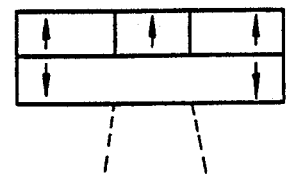
FIG. 5D  COOLING PROCESS
$T = T_{CP}$
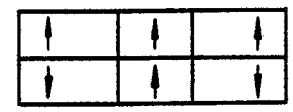
FIG. 5E  COOLING PROCESS
$T = T_{ini}$
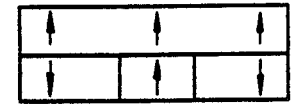
FIG. 5F  LASER BEAM RADIATION
$T_{compB} < T < T_{CP}$
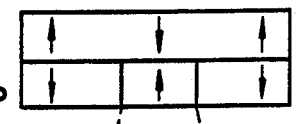
FIG. 5G  LASER BEAM RADIATION
$T = T_{CP}$
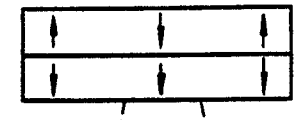
FIG. 5H  COOLING PROCESS
$T = T_{ini}$
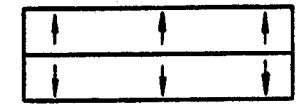
RECORDING OPERATION (BEAM OF HIGH LEVEL)
ERASING OPERATION (BEAM OF LOW LEVEL)

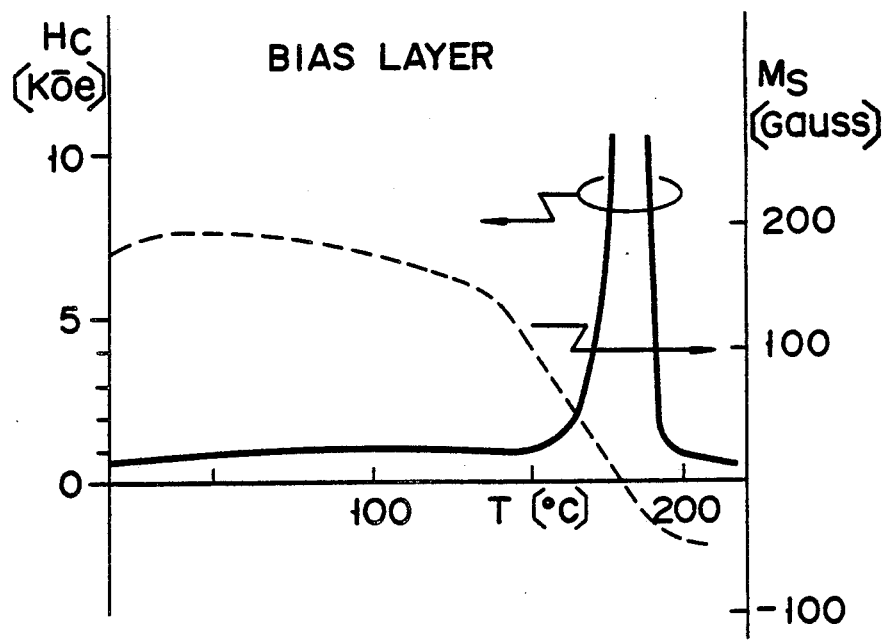
F I G. 6A
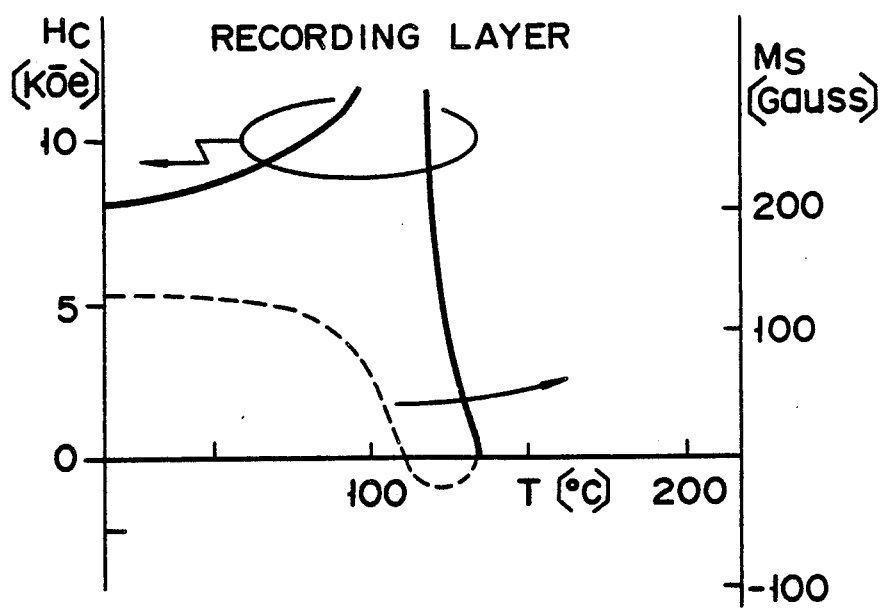
F I G. 6B

METHOD OF MAGNETO-OPTICALLY RECORDING AND ERASING INFORMATION ONTO A MAGNETO-OPTICAL INFORMATION STORAGE MEDIUM

BACKGROUND OF THE INVENTION

1. Field of the Invention

The present invention relates to a method of magneto-optically recording and erasing information, which allows overwriting to be carried out. It also relates to a magneto-optical information storage medium which is applied to the method.

2. Description of the Related Art

A thin film of rare earth-transition metal amorphous alloy (a-RE-TM) such as TbFe, TbCo, TbFeCo, GdTbFe and GdTbFeCo has an easy magnetization axis in a direction perpendicular to its surface and its magnetic characteristic changes in response to temperature. Magneto-optical information recording technique uses this characteristic of a-RE-TM film. In the magneto-optical information recording technique, recording of information is performed by following way:

Laser beam is irradiated onto a recording layer made of a-RE-TM to raise temperature at this beam-irradiated portion and reduce magnetic coercive force at the portion to a value smaller than external magnetic field, and a small reversed-magnetic domain is formed at the portion by the external magnetic field: erasing of information from the recording layer is performed by extinguishing this reversed-magnetic domain. Reproducing of information is performed by utilizing a magneto-optical effect such as the polar Kerr effect. This magneto-optical recording is superior in non-contact accessibility, exchangeability of medium and has high recording density, which are merits common to the optical recording. However, it has a demerit of making it more difficult to overwrite information, as compared with the magnetic recording.

Various kinds of overwriting techniques according to the magneto-optical information recording have been proposed. The most attractive one of them is of the optical modulation and one beam type (which is called one beam method).

As described in preliminarily-opened Japanese Patent Application Sho 62-175948, for example, the one beam method comprises the steps of previously applying initial auxiliary magnetic field to a magneto-optical information storage medium, which is provided with a recording/reproducing layer and an auxiliary recording layer, to orient magnetization in the auxiliary recording layer to a predetermined direction, and then irradiating pulse-like-modulated beam onto the medium to form bits whose magnetization is directed in one direction when the strength of the beam is high in level and bits whose magnetization is directed in the opposite direction when the strength of the beam is low in level. According to this technique, however, the recording/reproducing layer and the auxiliary recording layer are exchange-coupled with each other. Exchange coupling force, which is difficult to control, must be therefore controlled in such a way that magnetic coercive forces of the recording/reproducing and auxiliary recording layers are in a specific relation to the exchange coupling force. This makes it difficult to make the medium. Further, magnetization in the auxiliary recording layer must be oriented to a certain direction before the overwriting operation. This makes it necessary to use a large-sized initial-magnetizing magnet which can apply several KOe.

The optical modulation one beam method has attracted attention like this as the overwriting technique according to the magneto-optical information recording manner, but it is complicated and difficult to control. Therefore, a magneto-optical information recording method enabling to perform overwriting which is suitable for practical use has not been realized yet.

SUMMARY OF THE INVENTION

The present invention is therefore intended to eliminate the above-mentioned drawbacks and the object of the present invention is to provide a method of magneto-optically recording and erasing information, which can practically make the one-beam-power-modulated overwriting by way of the optical modulation technique, and also to provide a magneto-optical information storage medium which can be applied to the method.

According to the present invention, there is provided a method of magneto-optically recording and erasing information which comprises irradiating pulse-like laser beam onto a magneto-optical information storage medium, the intensity of said laser beam being modulated into high and low levels corresponding to information to be recorded, said magneto-optical information storage medium including recording and bias layers which have perpendicular magnetic anisotropy and which are stacked one upon the other to apply coupling interaction which is mainly magnetostatic interaction to each other, and magnetization-reversing temperature of the bias layer being higher than that of the recording layer. According to this method, information recording can be achieved as will be described in the following paragraph a) and information erasing ca be achieved as will be described in the following paragraph b):

a) When the pulse-like laser beam of high intensity level is irradiated onto the medium, the beam-irradiated portion of the medium is heated to the magnetization-reversing temperature of the bias layer to form a reversed magnetic domain in the bias layer; when the beam-irradiated portion is then cooled to the magnetization-reversing temperature of the recording layer, magnetization in the recording layer is directed in a predetermined direction by first leakage magnetic field applied to the recording layer, and magnetization of the bias layer is directed in same direction as that under initial state by second leakage magnetic field applied to the bias layer until the beam-irradiated portion is cooled to room temperature.

b) When the pulse-like laser beam at low level is irradiated onto the medium, the beam-irradiated portion of the medium is heated to the magnetization-reversing temperature of the recording layer, and due to third leakage magnetic field applied to the recording layer at this time, the direction of magnetization of the recording layer is oriented to a direction reverse to that in which the layer is magnetized when the laser beam at high level is irradiated onto the medium.

The term "leakage magnetic field" means those usually applied from outside. It is preferable in this case that the first and third leakage magnetic fields are applied mainly from the bias layer and that the second one is applied mainly from the recording layer.

The leakage magnetic fields may include even auxiliary external magnetic field if necessary. This external magnetic field may be applied while irradiating the laser beam, or it may be applied when medium temperature is near the magnetization-reversing temperature of the bias layer.

According to the present invention, there is also provided a magneto-optical information storage medium including recording and bias layers which have perpendicular magnetic anisotropy and which are stacked one upon the other to apply coupling interaction which is mainly magnetostatic interaction to each other, wherein when magnetization-reversing temperature of the recording layer is denoted by $T_{CP}$ and that in the bias layer by $T_W$, they are in a relation of $T_{CP} < T_W$.

An intermediate layer made of dielectric may be interposed between the recording and bias layers to prevent exchange coupling force from acting between the recording and bias layers.

According to the present invention, the magnitude of the leakage magnetic fields applied to the recording and bias layers is determined in such a way that, the direction of magnetization at a portion of the recording layer irradiated by high power pulse is reverse to that at another portion thereof irradiated by lower power pulse, regardless of the information recorded in the recording layer. This enables the practical one beam power modulated overwriting to be realized.

BRIEF DESCRIPTION OF THE DRAWINGS

FIGS. 3A to 3I show relations of magnetized direction with temperature of the bias and recording layers of the medium;

FIGS. 4A to 4D show magnetization distributions at the bias and recording layers in the states just before the states shown in FIGS. 3D, 3E, 3H and 3I, respectively;

FIGS. 5A to 5H show relations of magnetized direction with temperature of bias and recording layers of a magneto-optical information storage medium according to another embodiment;

FIGS. 6A and 6B are graphs showing temperature/magnetic characteristics which bias and recording layers of the second medium have;

DETAILED DESCRIPTION OF THE PREFERRED EMBODIMENTS

Figure 1:
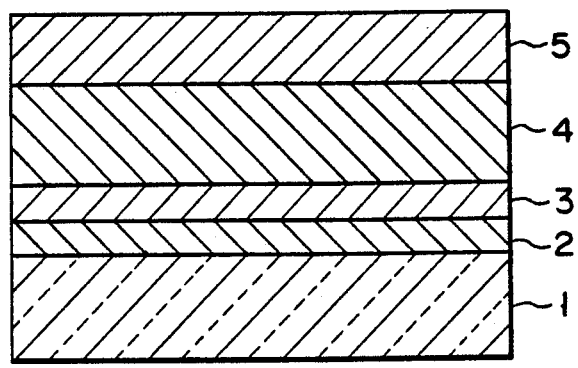
FIG. 1 is a sectional view showing an example of the magneto-optical information storage medium according to the present invention.

FIG. 1 is a sectional view showing an embodiment of the magneto-optical information storage medium to which a method of magneto-optically recording and erasing information according to the present invention is applied. Reference numeral 1 represents a substrate made of glass or transparent resin. Recording layer 2, intermediate layer 3, bias layer 4 and protective layer 5 are stacked one upon the others in this order on substrate 1. It is preferable that these layers are formed by the thin film forming technique such as a sputtering technique.

Each of recording layer 2 and bias layer 4 has an easily magnetized axis in a direction perpendicular to its face and is made of a-RE-TM alloy such as TbFe, TbCo, TbFeCo,.GdTbFe, GdTbFeCo and GdTbCo. Magnetization-reversing temperature $T_W$ of bias layer 4 is set higher than magnetization-reversing temperature $T_{CP}$ of recording layer 2.

According to the present invention, the magnetization reversal of recording or bias layer 2 or 4 upon recording and erasing information is achieved not by exchange coupling force applied from the other layer but by leakage magnetic fields leaked from the both layers and magnetic field applied from outside if necessary. Therefore, recording and bias layers 2 and 4 are formed so as not to exert an exchange coupling force between the layers. Even when the exchange coupling force acts on each other, it is better that the exchange coupling force is set a value smaller enough than leakage magnetic field.

Intermediate layer 3 is intended to prevent these exchange coupling forces and preferably made of dielectric such as Si-N, Si-O and Zr-O. When the exchange coupling force is small enough, intermediate layer 3 can be omitted.

The thickness of intermediate layer 3 is determined in accordance with the characteristics of this layer 3, such that the medium achieves desirable Kerr enhancement at the time of reproduction, and also has a sufficient laser beam absorption efficiency. Usually, the thickness of intermediate layer 3 is preferably lower than 200 Å. When it is intended to extinguish the exchange coupling force between recording and bias layers 2 and 4, it is enough to set the thickness of intermediate layer 3 at several angstroms. However, it is preferably made so thin as to allow bias layer 4 to apply sufficiently large leakage magnetic field to recording layer 2 and to be sufficiently heated to $T_W$ at the time of laser beam irradiation. Considering this, the thickness of intermediate layer 3 is more preferably in a range of 5Å to 500Å. Bias layer 4 does not contribute to reproducing signals but it is intended only to allow heat caused by laser irradiation to spread therethrough. Therefore, intermediate layer 3 may not be transparent.

It is preferable that bias layer 4 is made so thick as to apply sufficiently large leakage magnetic field to recording layer 2 and so thin as to be sufficiently heated to $T_W$ at the time of laser irradiation. Considering this, the thickness of bias layer 4 is preferably in a range of 250Å to 5000Å and more preferably in a range of 1000Å to 3000Å.

It is preferable that recording layer 2 is made so thick as to apply sufficiently large leakage magnetic field to bias layer 4 and so thin as to be sufficiently heated to a temperatures high enough to cause the magnetization reversing at the time of laser irradiation. The leakage magnetic field applied from recording layer 2 to bias layer 4 can be supplemented by external magnetic field. Considering this, the thickness of recording layer 2 is preferably in a range of 100Å to 5000Å, more preferably in a range of 250Å to 1500Å.

When recording and bias layers 2 and 4 are to be formed by way of the thin film forming technique such as a sputtering, it will be difficult that each of recording and bias layers 2 and 4 has sufficient than 100Å.

Protective layer 5 is made of dielectric material, for example, and it serves to protect recording and bias layers 2 and 4. It is preferable that protection layer 5 is provided, but this protection layer 5 is not essential and may be omitted.

When information is recorded and erased to and from this magneto-optical information storage medium, pulse-like laser beam whose intensity is modulated into high and low levels responsive to information to be recorded is irradiated onto the medium.

That portion of the medium which is irradiated by pulse of high intensity level is heated to magnetization-reversing temperature $T_W$ of bias layer 4 and a reversed magnetic domain is thus formed in bias layer 4. When the pulse-irradiated part of the medium is then cooled to magnetization-reversing temperature $T_{CP}$ of recording layer 2, magnetization in recording layer 2 is directed in a predetermined direction due to first leakage magnetic field applied to recording layer 2. Thereafter, magnetization in bias layer 4 is directed in the same direction as under initial state due to second leakage magnetic field applied to bias layer 4 until the pulse-irradiated portion of the medium is cooled to room temperature. Information is thus recorded at that portion of recording layer 2 which is irradiated by the pulse of high level.

That portion of the medium which is irradiated by pulse of low intensity level is heated to magnetization-reversing temperature $T_{CP}$ of recording layer 2, while magnetization of recording layer 2 is oriented to a direction reverse to that under recording process due to third leakage magnetic field applied to recording layer 2. Information is thus erased from that part of recording layer 2 which is irradiated by the pulse of low level.

These recording and erasing operation can be performed, regardless of the information recorded in the recording layer. Therefore, one beam power-modulated overwriting can be performed.

Figure 2A:
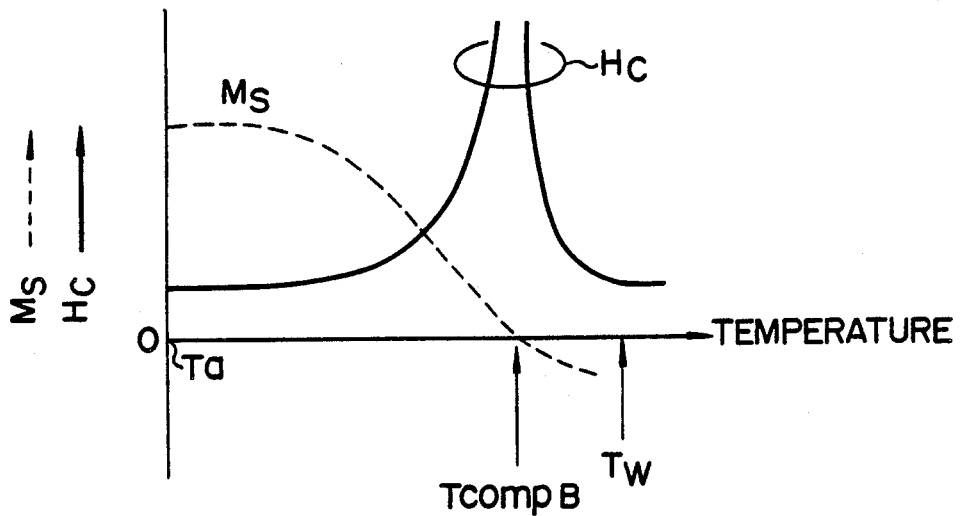
FIGS. 2A and 2B are graphs showing temperature/magnetic characteristics which bias and recording layers of the medium have.
Figure 2B:
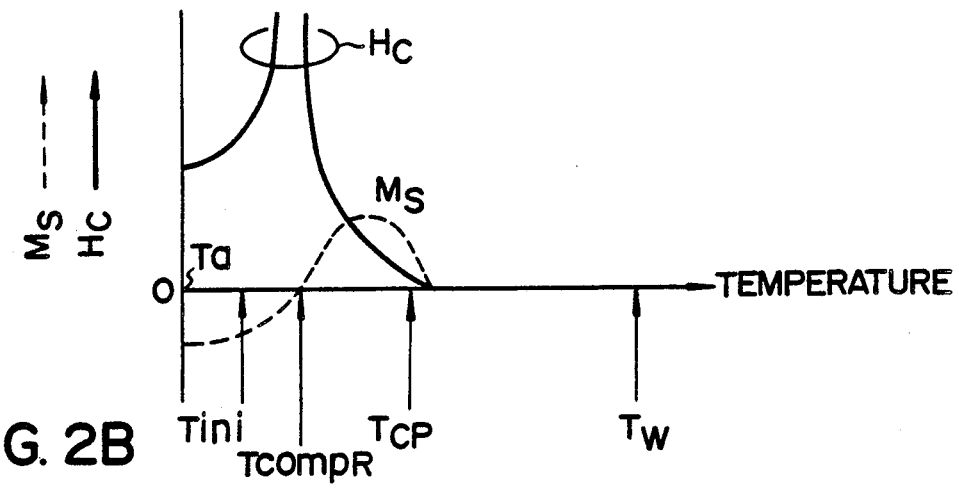

There will be described the information recording and erasing operation in a magneto-optical information storage medium which has bias layer 4 having such temperature-magnetic characteristics as shown in FIG. 2A and recording layer 2 having such temperature-magnetic characteristics as shown in FIG. 2B.

In FIGS. 2A and 2B, solid lines represent coercive force Hc and broken lines magnetization Ms. Ta denotes ambient temperature, $T_{compR}$ and $T_{compB}$ compensation temperatures at which direction of magnetization is reversing in recording and bias layers, $T_{CR}$ Curie temperature of the recording layer, $T_W$ magnetizastion-reversing temperature of the bias layer, $T_{CP}$ magnetization-reversing temperature of the recording layer, and $T_{ini}$ initializing temperature at which magnetization of the bias layer is again reversed at the time of recording operation.

$T_{compR} < T_{CP} < T_{compB} < T_W$ in this case.

FIGS. 3A to 3I show directions of magnetizations of the recording and bias layers which have the above-mentioned temperature-magnetic characteristics in the recording and erasing processes. In FIGS. 3A to 3I, only the recording and bias layers are picked up from the magneto-optical information storage medium. Magnetization-reversing magnetic domain formed in the recording and bias layers is partitioned by vertical lines and a laser beam is denoted by broken lines. FIGS. 3A to 3E show information recording process and FIGS. 3F to 3I information erasing process, wherein directions of magnetizations in each of the recording and bias layers are shown every temperature. The direction of external magnetic field Hex applied to the medium at the time of information recording and erasing operations is shown at right side in FIG. 3A.

FIG. 3A shows initial state under which nothing is recorded or erasing state. The direction of magnetization of recording layer 2 is opposite to that of bias layer 4 under this state.

When recording laser beam having high level is irradiated onto the medium, temperature at this beam-irradiated portion of the medium rises and when it exceeds Curie temperature $T_{CR}$ of recording layer 2, magnetization of recording layer 2 is lost. Temperature at the beam-irradiated portion further rises and when it exceeds compensation temperature $T_{compB}$ of bias layer 4, too, the direction of magnetization of that portion of bias layer 4 which corresponds to the beam-irradiated portion is inverted and those in other parts of recording and bias layers are as shown in FIG. 3B.

When temperature at the beam-irradiated portion further rises and reaches magnetization-reversing temperature $T_W$ of the bias layer, coercive force Hc of bias layer 4 lowers, as shown in FIG. 2A, and in this portion the direction of magnetization of bias layer 4 is reversed to the direction of external magnetic field $H_{ex}$ to be formed the reversed magnetic domain, as shown in FIG. 3C.

When the irradiation of laser beam is finished, the medium is cooled and when temperature T of the beam-irradiated portion of the medium reaches magnetization-reversing temperature $T_{CP}(<T_{compB})$ of recording layer 2 during natural cooling of the medium, direction of magnetization of bias layer 4 is directed downward. In this case, since magnetizations are distributed this time, as shown in FIG. 4A, in those areas of recording and bias layers 2 and 4 which correspond and are adjacent to the beam-irradiated portion of the medium, magnetic field leaked mainly from bias layer 4 is directed downward, so that a magnetic domain directed downward can be formed in recording layer 2, as shown in FIG. 3D.

The state shown in FIG. 3D is the one when magnetization is being formed or just after magnetization is formed in recording layer 2. Therefore, the coercive force of recording layer 2 is small and the reversed magnetic domain can be formed by a magnetic field of which intensity is as small as that of the leakage magnetic field. Material and thickness of bias layer 4 and $H_{ex}$ are set in such a way that vertical components of the first leakage magnetic field applied to recording layer 2, which is represented by vector sum of the leakage magnetic field generated from bias layer 4 and $H_{ex}$, can be directed downward. Therefore, the magnetization of bias layer 4 is transferred to recording layer 2 by the first leakage magnetic field, and a magnetic domain directed downward are thus formed in recording layer 2.

When the beam-irradiated portion is further cooled and $T=T_{ini}(<T_{compR})$, the direction of magnetization of recording layer 2 at the beam-irradiated portion is inverted, as shown in FIG. 2B, and vertical component of leakage magnetic field generated from recording layer 2 is directed upward. Coercive force ($H_{CB}(T_{ini})$) of bias layer 4 lowers, as shown in FIG. 2A. Magnetizations in those portions of recording and bias layers 2 and which are irradiated by laser beam and adjacent to these beam-irradiated portions are distributed, as shown in FIG. 4B. Material and thickness of recording layer 2 and $H_{ex}$ are set in such a way that vertical components of the second leakage magnetic field applied to bias layer 4, which is represented by vector sum of the leakage magnetic field generated from recording layer 2 and $H_{ex}$, can become larger than $H_{CB}(T_{ini})$. Therefore, the magnetization of bias layer 4 at the beam-irradiated portion is again reversed by the second leakage magnetic field, and magnetizations in recording and bias layers 2 and 4 are in the states shown in FIG. 3E. As a result, the reversed magnetic domain is formed only at the beam-irradiated portion of recording layer 2. Thereafter, this magnetized state of recording and bias layers 2 and 4 is kept until Ta thereby being made "recorded state" under which the reversed magnetic domain is formed in recording layer 2.

When the second magnetization reversal is caused in bias layer 4 and temperature of the beam-irradiated portion is cool to $T_{ini}$ or less, $H_{ex}'$ different from $H_{ex}$ may be added as shown in FIG. 3E. The magnetization reversal in bias layer 4 can be thus made easier.

The information erasing operation will be described.

When erasing laser beam of low level is irradiated onto the medium on which information has been recorded and which is under such a state as shown in FIG. 3E, temperature at the beam-irradiated portion rises. When temperature of this beam-irradiated portion is lower than $T_{compR}$, the magnetized state is same as shown in FIG. 3E, as apparent from FIG. 3F.

When temperature of the beam-irradiated portion further rises and exceeds compensation temperature $T_{compR}$ of recording layer 2, the direction of magnetization of recording layer 2 is inverted, as shown in FIG. 3G.

When temperature of the beam-irradiated portion then further rises and $T=T_{CP}$, leakage magnetic field from bias layer 4 is directed downward, because of the distribution of the magnetization shown in FIG. 4C. However, no reversed magnetic domain is present in bias layer 4. Therefore, the intensity of magnetic field in bias layer 4 becomes smaller as compared with that in the case shown in FIG. 4A. In this case, material and thickness of bias layer 4 and $H_{ex}$ are set in such a way that vertical components of the third leakage magnetic field applied to recording layer 2, which is represented by vector sum of the leakage magnetic field directed downward and generated from bias layer 4 and $H_{ex}$, can be directed upward. Since this state is established at the time when magnetization is generating or just after magnetization has generated, the coercive force of recording layer 2 is small. Therefore, reversed magnetic domain can be easily formed by a magnetic field of which intensity is as small as that of the leakage magnetic field under this state only by the magnetic field leaked, and a magnetic domain which is again reversed is formed by the third leakage field, as shown in FIG. 3H.

Thereafter, when temperature at the beam-irradiated portion lowers to $T_{compR}$ and then to $T_{ini}$, the magnetization of recording layer 2 is inverted. However, since magnetization distributions in recording and bias layers 2 and 4 become such as shown in FIG. 4D in this time, no leakage magnetic field so large as to reverse the magnetization of bias layer 4 in the information recording operation is generated and this state is kept until Ta to be made "information-erased state" as shown in FIG. 3I.

When information is once erased, the above-described operation is only repeated even if temperature at the beam-irradiated portion is repeatedly raised to $T_{CP}$. It is not needed to read, prior to the information erasing operation, whether or not erasing power is added after once reading information recorded, as in the case of the flip-flop recording medium disclosed by preliminarily-opened Japanese Patent Application Sho 62-80846.

The above has described the information recording and erasing operations of the magneto-optical information storage medium according to the embodiment. Regardless of the record in the recording layer information recorded on the "recorded state" can be established when the medium is irradiated by laser beam of high level, while "erased state" when the medium is irradiated by laser beam of low level. More specially high speed overwriting can be realized when the medium is irradiated by laser beam which has been modulated into high and low levels according to information to be newly recorded. Therefore, another laser beam which was needed to detect information-recorded magnetic domain when high speed overwriting was intended with the conventional magneto-optical information storage medium having the bias layer is not necessary, and high speed overwriting can be achieved by a simple construction of the one head and one beam type, and sufficient erasing margin is available.

Even when external magnetic field $H_{ex}$ is applied at the time of the information recording and erasing operations, direction and strength of this magnetic field may be same in both operations and the strength itself may be so small as about several hundreds Oe. This enables the device to be smaller-sized and leaving the servo-electromagnetic drive system in the optical head not influenced.

As compared with the conventional overwriting medium or system, the present invention is more excellent in that 1) material and composition by which the bias and recording layers are formed can be selected from a wider group regardless of the fact whether the compensation point is present or not, that 2) exchange coupling interaction which is difficultly controlled is not used, and that 3) means for applying external magnetic field is not essential.

Reproduction of information can be achieved by irradiating laser beam onto the medium and using the magneto-optical effects such as Kerr effect, as seen in the case of the conventional magneto-optical information storage medium. The power of reproducing laser may be so large as to allow temperature at the beam-irradiated part of the medium to rise to a value lower than $T_{CP}$, and there is no demerit even if the temperature of the medium rises higher than $T_{compR}$.

The magneto-optical information storage medium having such arrangement as shown in FIG. 1 was practically made and tests were conducted about the relation between the magnitude of leakage magnetic field applied from the bias layer to the recording layer and the thickness of the intermediate layer. Test results thus obtained will be described. The bias layer was made of $(Gd_{0.7}Tb_{0.3})_{25}Co_{75}$ and had a thickness of 1000 Å in this case. The compensation temperature of the bias layer was 128° C. Materials of recording layer and intermediate layer were $Tb_{23}Fe_{77}$ and Si-N, respectively. The thickness of recording layer was 1500 Å.

When laser beam was irradiated onto this magneto-optical information storage medium (magnetization of the bias layer was not reversed and center temperature of the bias layer was 180° C.), there was examined the relation between the magnitude of leakage magnetic field generated mainly from the bias layer and the thickness of the intermediate layer. The relation is shown in Table 1. When the thickness of the intermediate layer was 200 Å, sufficiently large leakage magnetic field of 300 Oe was applied to the recording layer, as shown in Table 1. It has been confirmed that the intermediate layer may be smaller than 2000 Å because the magnitude of leaked magnetic field applied to the recording layer may be practically about 150 Oe, about 50% of 300 Oe when the thickness of the intermediate layer is 200 Å.

TABLE 1

| Thickness of Intermediate Layer (Å) | Magnetic Field Leaked (Oe) |
|---|---|
| 200 | 300 |
| 500 | 290 |
| 1000 | 240 |
| 2000 | 170 |

Information recording and erasing operations will be described in a case where a material in which no compensation temperature is present is used as recording layer 2. In this case, magnetization-reversing temperature $T_{CP}$ of the recording layer, compensation temperature $T_{compT}$ of the bias layer and magnetization-reversing temperature $T_W$ of the bias layer are in a relation of $T_{CP} < T_{compB} < T_W$. The information recording and erasing operations in this case will be described referring to FIGS. 5A to 5H and 8A to 8D. FIGS. 5A to 5H are similar to FIGS. 3A to 3I.

When recording laser beam is irradiated onto the medium which is under initial state as shown in FIG. 5A. and it becomes that $T_{compB} < T < T_{CP}$ as shown in FIG. 5B. the direction of magnetization of bias layer 4 at the beam-irradiated part is inverted.

When temperature of the beam-irradiated part reaches $T_W$ as shown in FIG. 5C, a reversed magnetic domain is formed in bias layer 4 and magnetization of recording layer is extinguished.

Figure 8A:
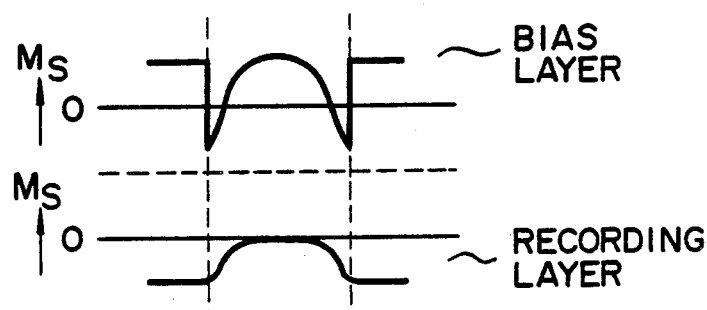
FIGS. 8A to 8D show magnetization distributions at the bias and recording layers in the states just before the states shown in FIGS. 5D, 5E, 5G and 5H, respectively.

Thereafter, when the beam-irradiated portion is then cooled and $T_{CP}$ as shown in FIG. 5D, the magnetization distribution is as shown in FIG. 8A and magnetization of bias layer 4 is transferred to recording layer 2 by the first leakage magnetic field applied to recording layer 2, and a reversed magnetic domain is formed in recording layer 2.

Figure 8B:
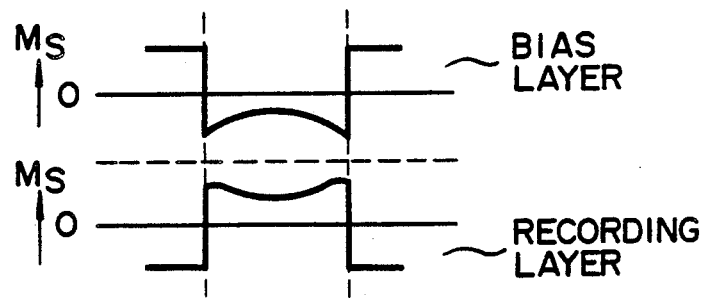

When the beam-irradiated part is further cooled and $T = T_{ini}$, the magnetization distribution is as shown in FIG. 8B and the reversed magnetic domain in bias layer 4 is extinguished by the second leakage magnetic field applied to bias layer 4. Information-recorded state can be thus established.

In the erasing process, when erasing beam is irradiated onto the medium and $T_{compB} < T < T_{CP}$ as shown in FIG. 5F in the course of the information erasing operation, the direction of magnetization of bias layer 4 at the beam-irradiated part is inverted.

Figure 8C:
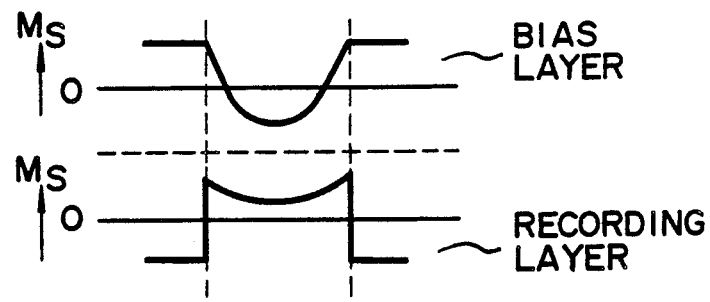
Figure 8D:
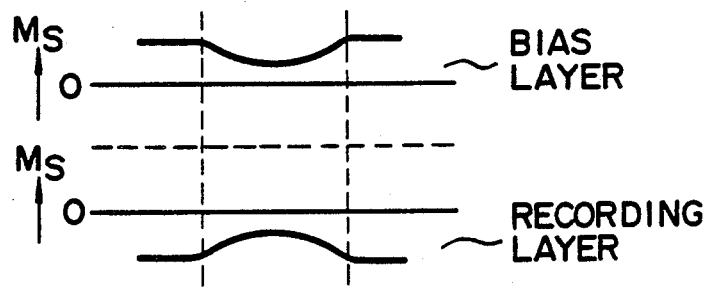

When temperature of the beam-irradiated portion reaches $T_{CP}$ as shown in FIG. 5G, the magnetization distribution is as shown in FIG. 8C and the magnetization of recording layer 2 is reversed downward again by the third leakage magnetic field applied to recording layer 2.

When the beam-irradiated portion is then cooled and temperature at this portion reaches $T_{ini}$, the direction of magnetization of bias layer 4 is inverted and information-erased state can be thus established as shown in FIG. 5H. No external magnetic field is needed in this case.

Like this, when no compensation temperature is present in recording layer 2, information can be similarly recorded and erased on and from the medium, thereby enabling the overwriting of one beam power modulated type to be achieved.

EXAMPLE 1

Recording layer 2 made of $Tb_{23}Fe_{77}$ and having a thickness of 1500 Å, intermediate layer 3 made of Si-N and having a thickness of 100 Å, bias layer 4 made of $(Gd_{0.5}Tb_{0.5})_{28}Co_{72}$ and having a thickness of 2000 Å, and Si-N protective film 5 having a thickness of 1000 Å were successively formed on glass substrate of 5.25'$\phi$ provided with a tracking groove by way of RF sputtering. Bias layer 4 had such temperature-magnetic characteristics as shown in FIG. 6A while recording layer 2 had such temperature-magnetic characteristics as shown in FIG. 6B. $T_{compB} = 183°$ C., $T_{compR} = 112°$ C., $T_{CP} = 137°$ C. and $H_{ex} = 500$ Oe.

Description will be made referring to FIGS. 3A through 3I and FIGS. 4A through 4D. When recording beam is irradiated onto the medium and temperature at this beam-irradiated portion reaches $T_W$ or 280° C., a reversed magnetic domain can be formed in bias layer 4 (FIG. 3C). When this portion is cooled to $T_{CP}$ or 140° C., the leakage magnetic field of bias layer 4 in the center thereof becomes about 730 Oe. When 730 Oe is subtracted by $H_{ex}$ (or 500 Oe), it becomes about 230 Oe, directing downward, in FIG. 4A and a reversed magnetic domain is formed in recording layer 2, as shown in FIG. 3D. When the beam-irradiated portion is further cooled and temperature at this portion becomes equal to $T_{ini}$ or 90° C., the leakage magnetic field of recording layer 2 in the center thereof becomes about 370 Oe. When 370 Oe is added by $H_{ex}$, it becomes about 870 Oe, directing upward, in FIG. 4B. The coercive force of bias layer 4 is 610 Oe at the temperature of 90° C. and this value is smaller than the above-mentioned 870 Oe. Therefore, the reversed magnetic domain of bias layer 4 is again reversed as shown in FIG. 3E.

When temperature at the beam-irradiated portion is $T_{CP}$ or 140° C. in the course of the information erasing operation, the leakage magnetic field of bias layer 4 in the center thereof becomes about 170 Oe. When this 170 Oe is subtracted by $H_{ex}$, it becomes about 330 Oe, directing upward, as shown in FIG. 4C. Therefore, the magnetized state becomes so as shown in FIG. 3H, thereby enabling information erasing to be realized.

Using high and low level powers of 10 mW and 6 mW at a linear velocity of about 10 m/sec, one beam overwriting could be achieved relating to recording signals of 1 and 2 MHzs. Even when reproduction was made using a level power of 1.5 mW, signals showed no change.

EXAMPLE 2

Figure 7A:
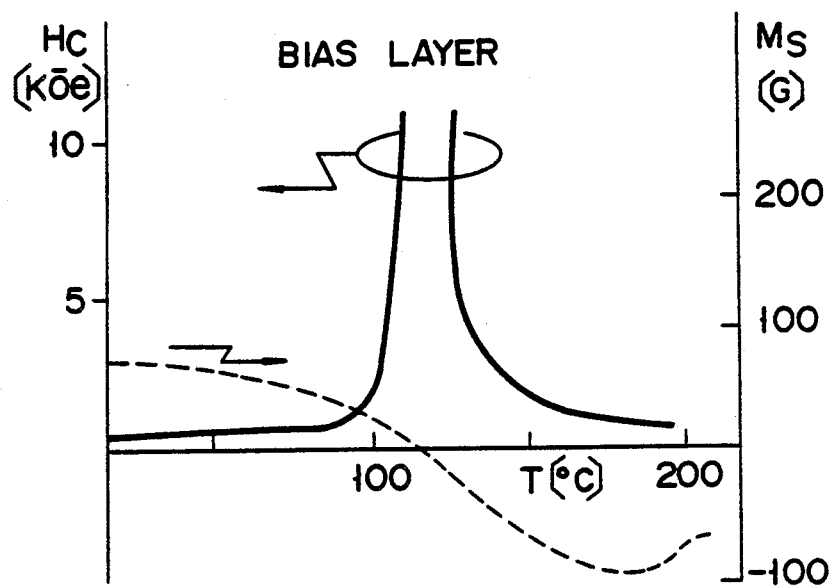
FIGS. 7A and 7B are graphs showing temperature/magnetic characteristic which bias and recording layer of a further medium have.
Figure 7B:
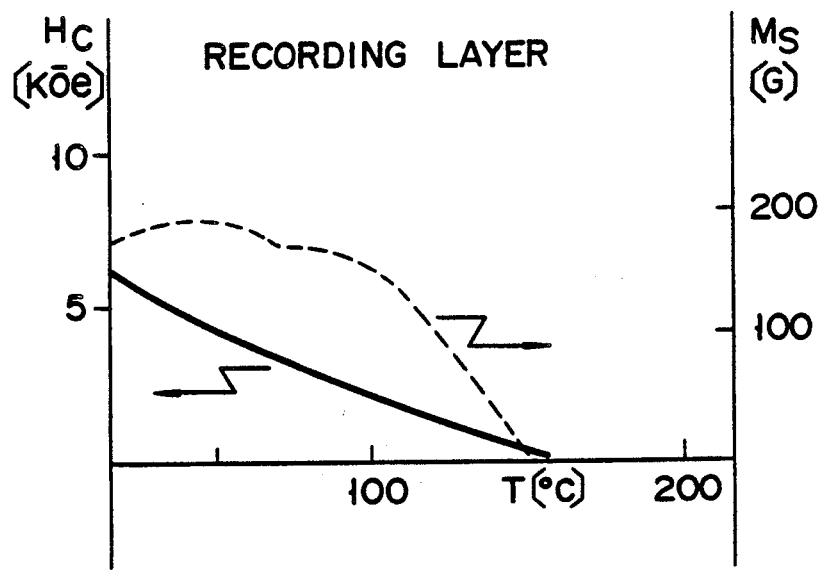

The magneto-optical information storage medium having same composition as that of example 1 was made according to the same manner as in the case of example 1. However, recording layer 2, 1500 Å thick, was made of $Tb_{18}Fe_{82}$, bias layer 4, 1500 Å thick, was made of $(Gd_{0.7}Tb_{0.3})_{25}Co_{75}$, and intermediate layer 3, 200 Å thick, was made of Si-N. Bias layer had such temperature-magnetic characteristics as shown in FIG. 7A, while recording layer 2 had such temperature-magnetic characteristics as shown in FIG. 7B. $T_{compB} = 124°$ C., $T_{CP} = 162°$ C. and no compensation point was present in recording layer 2. Magnetization-reversing temperature $T_{CP}$ of the recording layer, compensation temperature $T_{compB}$ of the bias layer, and magnetization-reversing temperature $T_W$ of the bias layer were in a relation of $T_{CP} < T_{compB} < T_W$.

Magnetized states in each of the layers at every temperature in the course of the information recording and erasing operations were same as shown in FIGS. 5A through 5H.

As shown in FIG. 5C, a reversed magnetic domain is formed in bias layer 4 at a temperature of 200° C. and when this portion is then cooled and temperature at this area reaches 160° C., the leakage magnetic field of bias layer 4 in the center thereof is about 230 Oe, directing upward, in FIG. 8A and the magnetization of bias layer 4 is transferred to recording layer 2 this time, as shown in FIG. 5D. When temperature becomes equal to $T_{ini}$ or 80° C., the leaked magnetic field of recording layer 2 in the center thereof is about 540 Oe, directing upward, in FIG. 8B. This value is larger than 430 Oe which is the magnetic coercive force of bias layer 4 at 80° C. Therefore, the reversed magnetic domain of bias layer 4 is again reversed as shown in FIG. 5E.

When temperature becomes equal to $T_{CP}$ or 140° C. in the course of the information erasing operation, the leakage magnetic field of bias layer 4 becomes about 470 Oe, directing downward, as shown in FIG. 8C, and downward magnetization is transferred to recording layer 2, as shown in FIG. 5G.

As apparent from the above, direct overwriting could be achieved without $H_{ex}$ and one beam overwriting could be realized relating to recording signals of 1 and 2 MHzs, using high and low level laser beam powers of 9 mW and 5 mW at a linear velocity of about 10 m/sec. Even when reproduction was made using a laser beam power of 1.5 mW, no change was seen about signals.

What is claimed is:

1. A method of magneto-optically recording and erasing information, comprising:

preparing a magneto-optical information storage medium including recording and bias layer which have perpendicular magnetic anisotropy and which are stacked one upon the other such that coupling interaction which is dominantly magnetostatic interaction acts therebetween, said recording layer having magnetization of a first direction, said bias layer having magnetization of a second direction opposite to said first direction, and a magnetization-reversing temperature of the bias layer being higher than that of the recording layer, said medium being irradiated with pulse-like laser beam intensity of which is modulated into high and low levels, thereby recording information thereon and erasing information therefrom;

irradiating the medium with the pulse-like beam of high intensity level to heat the beam-irradiated portion of the medium to the magnetization-reversing temperature of the bias layer to form a magnetization-reversed area in said bias layer, and then cooling the beam-irradiated portion to the magnetization-reversing temperature of said recording layer, directing magnetization of said recording layer to a direction of leakage magnetic field applied to the recording layer mainly from said bias layer, and directing magnetization of the bias layer in the same direction as said second direction by leaking magnetic field applied to said bias layer mainly from said recording layer until the beam-irradiated portion is cooled to room temperature; and irradiating the medium with the pulse-like laser beam at low level to heat the beam-irradiated portion of the medium to the magnetization-reversing temperature of the recording layer, and due to a leakage magnetic field applied to said recording layer mainly from said bias layer at this time, orienting the direction of magnetization of said recording layer to a direction reverse to that in which the layer is magnetized when the laser beam at high level is irradiated onto said medium.

2. The method according to claim 1, comprising:

applying an external magnetic field, having a direction of magnetization identical to said leakage magnetic field, in a direction from said bias layer to said recording layer, together with said leakage magnetic field, at h time of recording and also as the time of erasing.

3. The method according to claim 1, whereby when temperature at the portion of the medium irradiated with the pulse-like laser beam of high intensity level is near the magnetization-reversing temperature of the bias layer, an external magnetic field is applied.

* * * * *